(12) United States Patent
Landsnes

(10) Patent No.: US 9,067,321 B2
(45) Date of Patent: Jun. 30, 2015

(54) SYSTEM AND METHOD FOR VISUALIZATION OF PROCESS ERRORS

(75) Inventor: Øyvind Landsnes, Mandal (NO)

(73) Assignee: ABB AS (NO)

( * ) Notice: Subject to any disclaimer, the term of this patent is extended or adjusted under 35 U.S.C. 154(b) by 1682 days.

(21) Appl. No.: 12/370,811

(22) Filed: Feb. 13, 2009

(65) Prior Publication Data

US 2009/0204257 A1 Aug. 13, 2009

(30) Foreign Application Priority Data

Feb. 13, 2008 (EP) ..................................... 08101548

(51) Int. Cl.
*G06F 19/00* (2011.01)
*B25J 9/16* (2006.01)

(52) U.S. Cl.
CPC ..... *B25J 9/1674* (2013.01); *G05B 2219/40213* (2013.01); *G05B 2219/40216* (2013.01)

(58) Field of Classification Search
None
See application file for complete search history.

(56) References Cited

U.S. PATENT DOCUMENTS

| | | | |
|---|---|---|---|
| 4,356,378 A * | 10/1982 | Cloos et al. ................. | 219/124.1 |
| 4,380,696 A * | 4/1983 | Masaki ..................... | 219/124.34 |
| 4,547,800 A * | 10/1985 | Masaki ............................. | 348/95 |
| 4,675,502 A * | 6/1987 | Haefner et al. .......... | 219/124.34 |
| 4,831,549 A * | 5/1989 | Red et al. ....................... | 700/254 |
| 4,945,493 A * | 7/1990 | Huang et al. .................. | 700/251 |
| 5,006,999 A * | 4/1991 | Kuno et al. .................... | 700/253 |
| 5,083,073 A * | 1/1992 | Kato .............................. | 318/577 |
| 5,532,924 A * | 7/1996 | Hara et al. ...................... | 700/47 |
| 5,821,990 A | 10/1998 | Rudt et al. | |
| 5,903,663 A * | 5/1999 | Abend .......................... | 382/152 |
| 5,959,425 A * | 9/1999 | Bieman et al. ........... | 318/568.15 |
| 6,349,245 B1 * | 2/2002 | Finlay ........................... | 700/245 |
| 2004/0093122 A1 * | 5/2004 | Galibraith ..................... | 700/245 |
| 2005/0096892 A1 * | 5/2005 | Watanabe et al. ................. | 703/7 |

FOREIGN PATENT DOCUMENTS

| | | |
|---|---|---|
| EP | 1424173 A2 | 6/2004 |
| EP | 1518648 A2 | 3/2005 |
| WO | 2005/124482 A1 | 12/2005 |

OTHER PUBLICATIONS

European Search Report, Jul. 4, 2008, 2 pages.

* cited by examiner

*Primary Examiner* — Bhavesh V Amin
(74) *Attorney, Agent, or Firm* — Whitmyer IP Group LLC

(57) ABSTRACT

A system for visualizing process errors that occur in connection with processing a workpiece by means of a process tool and an industrial robot moving the tool along a path in relation to the workpiece during the processing. The system is configured to store information on process errors and information on where on the robot path the error occurred upon detecting the process errors and to present a visualization of the robot path and the position of the stored errors in relation to the robot path.

20 Claims, 1 Drawing Sheet

SYSTEM AND METHOD FOR VISUALIZATION OF PROCESS ERRORS

CROSS-REFERENCE TO RELATED APPLICATIONS

The present application claims priority of European patent application No. 08101548.9 filed on Feb. 13, 2008, the content of which is incorporated herein by reference.

FIELD OF THE INVENTION

The present invention relates to a method and a system for visualizing process errors that occur in connection with processing a workpiece by means of a process tool and an industrial robot moving along a path during the processing.

This invention is useful in connection with any type of processing using an industrial robot, such as welding, painting, polishing, grinding, and deburring.

BACKGROUND OF THE INVENTION

Industrial robots are often uses for carrying out a process on a workpiece. The process is, for example, painting or welding of a piece of a car. The robot is programmed to follow a path during the processing. A robot controller controls the movement of the robot in accordance with instructions in a stored control program. The process tool used by the robot during the processing, such a paint gun or a welding gun, is usually controlled by a separate process controller. The process controller and the robot controller are usually run on separate processors, but can be mounted in the same rack. However, it is also possible that the process controller and the robot controller are integrated and run on the same processor.

Sometimes during processing, process errors occur, such as insufficient paint flow. The process controller detects that a process error has occurred and stores the errors in an error log list stored on the process controller. The error list contains information on the type of error and the point in time when the error occurred. Upon a request, the error log list is presented to a user. The error log list is, for example, presented as printed list or presented on a display connected to the process controller. Some of those errors are occasional and occur randomly and there is no connection between the errors. However, some errors are related to the position of the robot. Those errors repeatedly occur at the same position along the robot path. The cause of such errors can be hard to find because it is often difficult to observe visually exactly when and where the error occurred.

SUMMARY OF THE INVENTION

The object of the present invention is to facilitate for a user to establish the cause of a process error that repeatedly occurs along a robot path during processing of a workpiece.

According to one aspect of the invention, this object is achieved by a method for facilitating a user to establish the cause of a process error that repeatedly occurs along a preprogrammed robot path in connection with processing on a workpiece by means of a process tool and an industrial robot moving along the preprogrammed path during the processing.

Such a method comprises storing information about where on the robot path the error occurred, and presenting a visualization of the robot path and the position of the stored errors in relation to the robot path.

According to the invention, the error is stored together with information on where on the robot path the error occurred. This information is used later, on the user's request, to present a visualization of the errors in relation to the robot path. The visualization enables a user to observe where on the path the errors occur, and thereby to decide on the cause of the fault. For example, a flexible tube providing paint to a paint gun can be pinched in a certain position along the path, or a part of the path is programmed to close to the edge of the work piece thereby causing a process error. The visualization of the error in relation to the programmed path provides the user with information so that the user knows how to reprogram the path of the robot. Most of the errors are process related, but some of the errors do also apply to certain robot errors, such as corner path failures.

According to an embodiment of the invention, the position of an object, carried by the robot during the processing, at the point in time when the error occurred is stored together with the information on the process error. The robot either carries the tool or the workpiece during the processing. If the robot carries the tool, the tool center point (TCP) of the robot at the point in time when the error occurred is preferably stored together with the information on the process error. The tool centre point is a point on the tool, which is well defined in relation to the base coordinate system of the robot and accordingly in relation to the robot path. The robot controller knows the position of the tool center point at any time along the path. Therefore, it is easy to store the TCP position when an error is detected. If the robot instead carries the workpiece, a point corresponding to the TCP is known in relation to the robot path, and thus the position of this point is preferably stored.

According to an embodiment of the invention, information identifying the current robot path is stored together with the errors. Optionally, selected information about the current job, such as path id and process parameters are captured and logged in such a way that it can be associated with the occurrence of the errors. This information is later used to present a visualization of the robot path. If different robot paths are used, it is important to know which path was run when the error occurred, in order to be able to display the error together with the path followed by the robot at the point in time the error occurred.

According to an embodiment of the invention, the method further comprises presenting a visualization of the workpiece, and the visualization of the robot path is presented in relation to the workpiece. It is advantageous to visualize the robot path in relation to the workpiece as it makes it easier for the user to find out the cause of of the error in cases when the error has to do with the position of the path in relation to the workpiece, such as in case the path is too close to the edge of the workpiece.

According to an embodiment of the invention, the visualization is a three dimensional visualization. A three dimensional visualization of the robot path, the workpiece, and the errors further improves the possibility to establish the cause of a process error.

According to an embodiment of the invention, movements of the robot is controlled by a robot controller, and the information on the errors and where on the robot path the error occurred, or at least a reference to where this information can be retrieved, are stored on the robot controller. For example, this information can be stored in an error log list. The error log list may contain information on the error type as well as the TCP-position when the error occurred, or at least a reference to where this information can be retrieved. For example, the error log list is stored in a database on the robot controller. It is an advantage to store this information on the robot controller since the robot controller holds the information on the TCP-position along the path.

A process controller configured to detect the process errors controls the process tool. According to an embodiment of the invention, the method comprises: upon detecting an error sending the information on the process error to the robot controller. When the process controller detects an error, information on the error, such as the type of error, is sent to the robot controller, which stores the information together with the present TCP-position, or the position of the workpiece if the robot moves the workpiece in relation to the tool.

According to an embodiment of the invention, the method comprises: sending the information on the process errors and where on the robot path the errors occurred to an external computer, and presenting the visualization on the external computer. Preferably, the external computer is provided with a graphical generator that generates a 3D graphical visualization of the workpiece, the robot path in relation to the workpiece, and the errors. Alternatively, the visualization is displayed on the display of a handheld teach pendant unit.

According to another aspect of the invention, this object is achieved by a system for facilitating a user to establish the cause of a process error that repeatedly occurs along a pre-programmed robot path on a workpiece by means of a process tool and an industrial robot moving along the preprogrammed path during the processing, wherein the system is configured to store information on process errors upon detecting the process errors and to present said information on the process errors, characterized in that the system further is configured to store information on where on the preprogrammed robot path the error occurred and the system comprises a graphical generator configured to generate a graphical visualization of the robot path and the positions of the process errors in relation to the robot path based on the preprogrammed robot path and said information on where on the preprogrammed robot path the errors occurred.

Such a system is configured to store information on where on the robot path the error occurred upon detecting the error, and to present a visualization of the robot path and the position of the stored errors in relation to the robot path.

BRIEF DESCRIPTION OF THE DRAWINGS

The invention will now be explained more closely by the description of different embodiments of the invention and with reference to the appended figures.

DETAILED DESCRIPTION OF THE INVENTION

Figure 1:
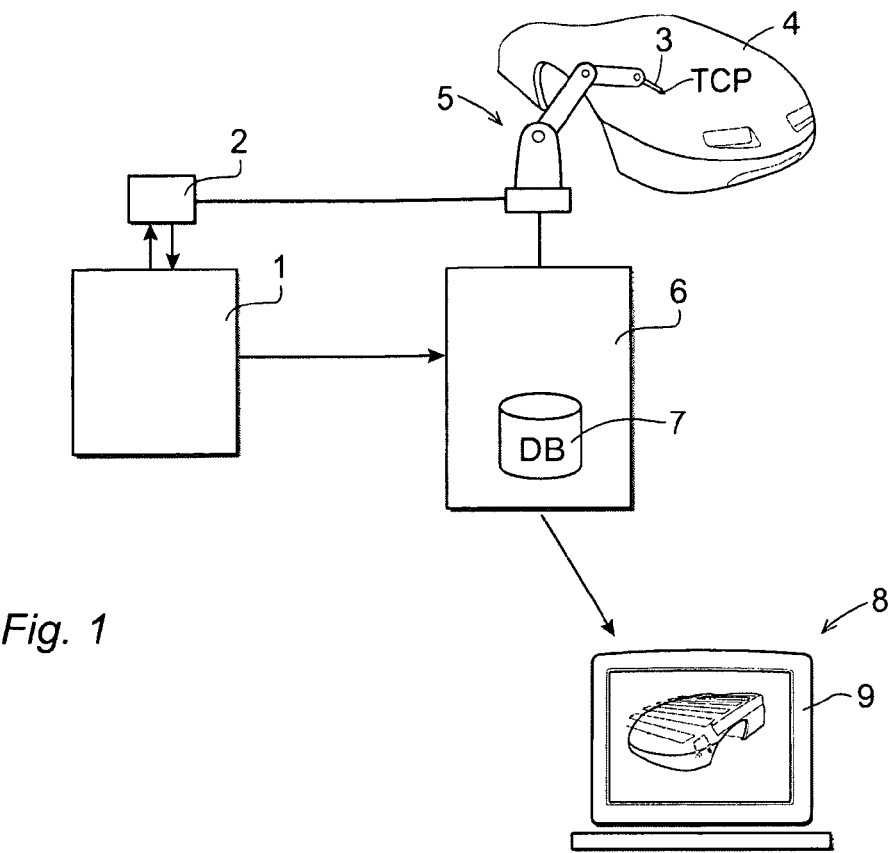
FIG. 1 shows a robot system according to an embodiment of the invention.

FIG. 1 shows an example of a system for visualizing process errors according to the invention. The system comprises a process controller 1 configured to control a process, such as a painting process or a welding process. The process controller includes hardware such as a processor, memory for storing process control programs, and communication means for communicating with other units. The process controller provides control signals to process equipment in accordance with instructions in the process control program. The process equipment includes a tool 3, for example a paint gun or welding gun, to be carried by the robot and a drive unit 2 for supplying the tool with what it needs to be able to carry out the process, for example equipment for providing paint of a sufficient pressure to the paint gun and equipment for supplying the welding gun with current. The tool carries out the process on a workpiece 4.

During processing, the tool 3 is moved by a robot 5 along a pre-programmed path on a workpiece. Alternatively, the tool may be stationary and the workpiece is moved by the robot. A robot controller 6 controls the movements of the robot in accordance with instructions stored in a robot program. The robot program defines a movement path to be followed by the robot during the processing. The process controller includes hardware such as a processor, memory for storing process control programs, and communication means for communicating with other units. The robot controller comprises a database 7. For each type of tool a tool centre point is defined in relation to the robot. Commonly, the tool centre point is defined as the tip of the tool 3. For example, if the tool is an arc-welding gun, the tool centre point is defined at the point where the wire exits from the gun. The position of the tool centre point is known in relation to the base coordinate system of robot, and accordingly the position of tool centre point is known in relation to the robot path.

The process controller 1 is also configured to supervise the process in order to detect errors in the process. Examples of process errors are a deviation in the paint supply, high voltage error during electrostatic painting, wire-feeder motor overload during arc welding. According to this embodiment of the invention, the process controller is configured, upon detecting an error, to send information on the error to the robot controller. The robot controller is configured, upon receiving the information on the error from the process controller, to store the information on the error together with the present tool centre point position of the robot and information identifying the current path followed by the robot in an error log list. Suitably, the error log list is stored in the database 7. The error log list contains information on the error type as well as the TCP position where the error occurred, or at least a reference to where this information can be retrieved. Optionally, information on the path program as well as process parameters are stored together with the error in the error log list.

The system further comprises an external computer 8, which can be an ordinary personal computer (PC) or a handheld device, such as a PDA or a Teach Pendant Unit (TPU). The external computer 8 includes a display device 9 and a graphical generator that generates 3D graphics that is displayed on the display device. The external computer 8 is configured to retrieve the error log list from the robot controller 6 upon a user request. The graphical generator is configured to generate a 3D graphical visualization of the processed workpiece, the robot path in relation to the workpiece, and the errors in relation to the robot path based on the information in the error log list. In order to generate a visualization of the path, the external computer needs more detailed information on the path, such as the same path program as the robot. The external computer can, for example, retrieve the necessary information on the path program based on the program id stored together with the error in the error list. The program id makes it possible for the external computer to retrieve a copy of the path program that was executed when the error occurred. The external computer has stored or retrieves a 3D CAD model of the processed work piece, and the graphical generator generates a 3D graphical visualization of the processed workpiece based on the CAD model of the workpiece.

The method according to the invention can, for example, be an implemented according to the following. When the process controller 1 detects an error, information on the error type is sent to the robot controller 6 together with a request to store the error together with the current tool centre point position. When the robot controller 6 receives information on the error and the request to store the error from the process controller, the robot controller stores the received information from the process controller together with the current tool centre point position in the database 7. For example, the error and the TCP position are stored in an error log list stored in the database. The error log list contains a list of the stored errors. Upon request, the error log list is sent to the external computer 8. The external computer generates a 3D graphical visualization of the work piece, the robot path in relation to the work piece, and the errors.

Figure 2:
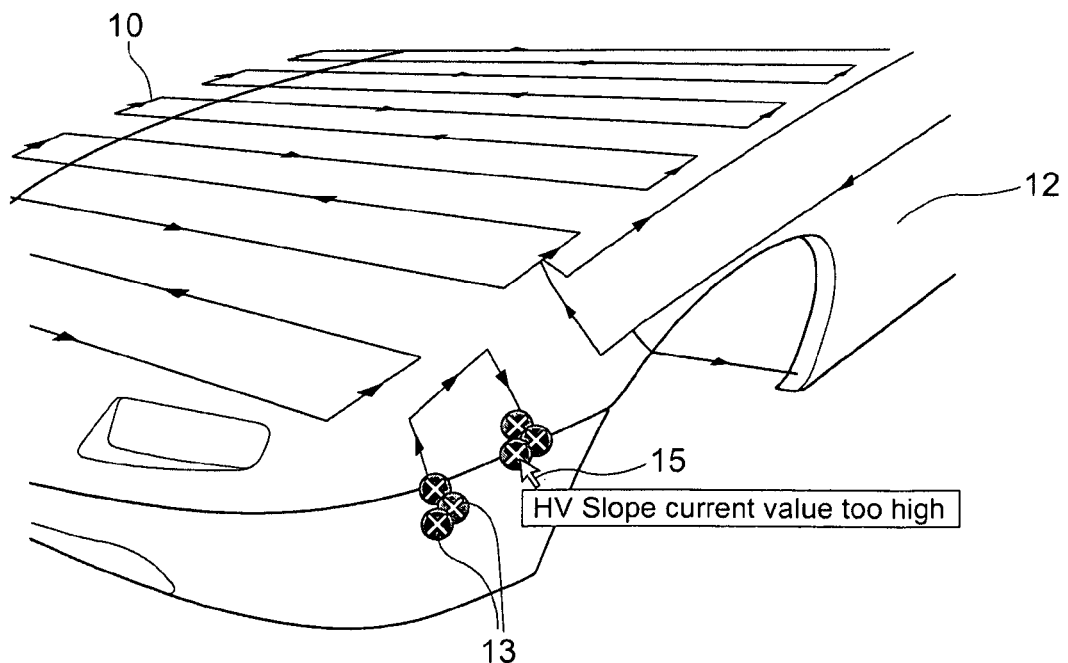
FIG. 2 shows a visualization of the relation between a workpiece, a robot path, and process errors.

FIG. 2 shows an example of such a visualization displayed on the display device 9 of the external computer. In FIG. 2, the robot path 10 is shown as lines with directions superimposed on a 3D CAD model of a workpiece 12, in this example a carbody. The errors 13 are shown as white crosses. In this example seven errors are displayed. The errors are gathered at two positions in relation to the robot path 10. More detailed information about an error, such as the type of the error, is displayed when a curser 15 is hovered over the cross.

The visualization may also include robot errors. The 3D visualization may contain different user scenarios. Typical user scenarios include:
- Show a 3D visualization of all process or robot errors that have occurred during the processing.
- Show a 3D visualization of all process errors in a selected process program.
- Show a list of path programs where process errors have occurred, let the user select a path program, and show 3D visualization of the process errors in relation to the path.
- Visualize high voltage errors in a selected process program that have occurred during the last week.

The present invention is not limited to the embodiments disclosed, and may be varied and modified within the scope of the following claims. For example, the error log list can be stored on the external computer or in the process controller. In an alternative embodiment, the system will not include any external computer. In such an embodiment the 3D visualization can be made on the display device of a teach pendant unit or on a display device connected to the process controller or to the robot controller. The invention is also applicable to a system having a process controller integrated with a robot controller, which means that the process controller and the robot controller share at least some of the hardware. It is possible to provide a 2D of the robot path in relation to the workpiece, and the errors.

What is claimed is:

1. A method for facilitating for a user to establish the cause of a process error that repeatedly occurs along a preprogrammed robot path in connection with processing on a workpiece by means of a process tool and an industrial robot moving along the preprogrammed path during the processing, wherein the method comprises storing information on process errors and presenting said information on the process errors, characterized in that the method further comprises
  upon detecting a process error, storing information on where on the robot path the error occurred, and
  presenting a graphical visualization of the preprogrammed robot path and the positions of the stored errors in relation to the preprogrammed robot path in order to enable the user to observe where on the preprogrammed path the repeatedly process errors occur and thereby facilitate for the user to establish the cause of the process errors.

2. The method according to claim 1, wherein the position of the tool or the workpiece, in dependence on which one is carried by the robot during the processing, at the point in time when the process error occurred is stored together with information on the process error.

3. The method according to claim 1, wherein the tool center point (TCP) of the robot at the point in time when the process error occurred is stored together with information on the process error.

4. The method according to claim 1, wherein information identifying the robot path is stored together with the process errors.

5. The method according to claim 1, wherein the method further comprises presenting a visualization of the workpiece, and the visualization of the robot path is presented in relation to the visualization of the work-piece.

6. The method according to claim 1, wherein said visualization is a three dimensional visualization.

7. The method according to claim 1, wherein movements of the robot is controlled by a robot controller, and said information on the process errors and where on the robot path the error occurred, or at least a reference to where this information can be retrieved, are stored on the robot controller.

8. The method according to claim 7, wherein the process tool is controlled by a process controller configured to detect the process errors, and the method comprises: upon detecting an error sending said information on the process error to the robot controller.

9. The method according to claim 1, wherein the method comprises: sending said information on the process errors and where on the robot path the errors occurred to an external computer, and upon request presenting said visualization on the external computer.

10. A system for facilitating for a user to establish the cause of a process error that repeatedly occurs along a preprogrammed robot path on a workpiece by means of a process tool and an industrial robot moving along the preprogrammed path during the processing, comprising:
  a robot controller that stores information on process errors upon detecting the process errors and stores information on where on the preprogrammed robot path the error occurred;
  a graphical generator that generates a graphical visualization of the robot path and the positions of the process errors in relation to the robot path based on the preprogrammed robot path and said information on where on the preprogrammed robot path the errors occurred; and
  a display device that displays said graphical visualization.

11. The system according to claim 10, wherein the robot controller stores the position of the tool or the workpiece, in dependence on which one is carried by the robot during the processing, at the point in time when the process error occurred together with the information on the process error.

12. The system according to claim 10, wherein the robot controller stores the tool center point (TCP) of the robot at the point in time when the process error occurred together with the information on the process error.

13. The system according to claim 10, wherein information identifying the robot path is stored together with the process errors.

14. The system according to claim 10, wherein the display device displays a visualization of the workpiece, and to displays the visualization of the robot path in relation to the workpiece.

15. The system according to claim 10, wherein the display device displays a three dimensional visualization of the path and the process errors.

16. The system according to claim 10, wherein the robot controller controls the movements of the robot, and the robot controller stores said information on where on the robot path the process error occurred together with the information on the process error, or at least a reference to where this information can be retrieved, on the robot controller.

17. The system according to claim 10, further comprising:
a process controller that controls the process tool and detects the process errors, and upon detecting an error sends information on the detected process error to the robot controller; and
wherein the robot controller receives the information on the detected process error and stores the information together with said information on where on the robot path the error occurred upon receiving the information on the detected process error.

18. The system according to claim 10, further comprising:
an external computer that displays said visualization upon request;
wherein the robot controller sends said information on the process errors and where on the robot path the errors occurred to the external computer.

19. The method according to claim 2, wherein the tool center point (TCP) of the robot at the point in time when the process error occurred is stored together with information on the process error.

20. The system according to claim 11, wherein the robot controller stores the tool center point (TCP) of the robot at the point in time when the process error occurred together with the information on the process error.

* * * * *